United States Patent
Wilson (12)

(10) Patent No.: US 6,697,875 B1
(45) Date of Patent: Feb. 24, 2004

(54) METHODS FOR BUILDING AND USING A NETWORK DEVICE DATABASE

(75) Inventor: Rodger P. Wilson, Superior, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 723 days.

(21) Appl. No.: 09/604,843

(22) Filed: Jun. 27, 2000

(51) Int. Cl.⁷ .............................................. G06F 15/16
(52) U.S. Cl. ...................... 709/245; 707/102
(58) Field of Search ................ 709/245, 246, 709/223; 370/382–383, 386, 389, 399, 409; 707/102

(56) References Cited

U.S. PATENT DOCUMENTS

| | | | | |
|---|---|---|---|---|
| 5,522,042 A | * | 5/1996 | Fee et al. .................... | 709/226 |
| 5,751,954 A | * | 5/1998 | Saito .......................... | 709/245 |
| 5,944,798 A | * | 8/1999 | McCarty et al. | |
| 6,209,023 B1 | * | 3/2001 | Dimitroff et al. ........... | 709/211 |
| 6,266,740 B1 | * | 7/2001 | Don et al. ................... | 711/114 |

OTHER PUBLICATIONS

International Search Report application No. PCT/US01/14813 mailed Mar. 21, 2002.*

* cited by examiner

Primary Examiner—Mehmet B. Geckil
(74) Attorney, Agent, or Firm—Meyertons Hood Kivlin Kowert & Goetzel, P.C.; B. Noel Kivlin

(57) ABSTRACT

Several methods are described for building and using a network device database. The network includes multiple enclosures, and each enclosure houses at least one device (e.g., a data storage device). The network may be, for example, a storage area network. One embodiment of a method for deriving the addresses of all devices of the network includes repeating the following steps for each enclosure of the network. A command is issued to the enclosure requesting information comprising device identifications (IDs) of all devices within the enclosure. A portion of an address of the enclosure is concatenated with each device ID to form the addresses of all devices within the enclosure. The network may include one or more Fibre Channel Arbitrated Loops (FC-ALs). In this case, the addresses of the enclosures and the devices coupled FC-ALs are fabric addresses. Each enclosure may include a small computer system interface (SCSI) enclosure services (SES) unit. In this case, the issuing step may include issuing a command to the SES unit of an enclosure requesting a page of information including device IDs of all devices within the enclosure. The page may be an SES-defined element descriptor page. A method for handling a fault condition within a device of the above described network is also described and includes building a database including addresses of all enclosures and devices of the network.

32 Claims, 7 Drawing Sheets

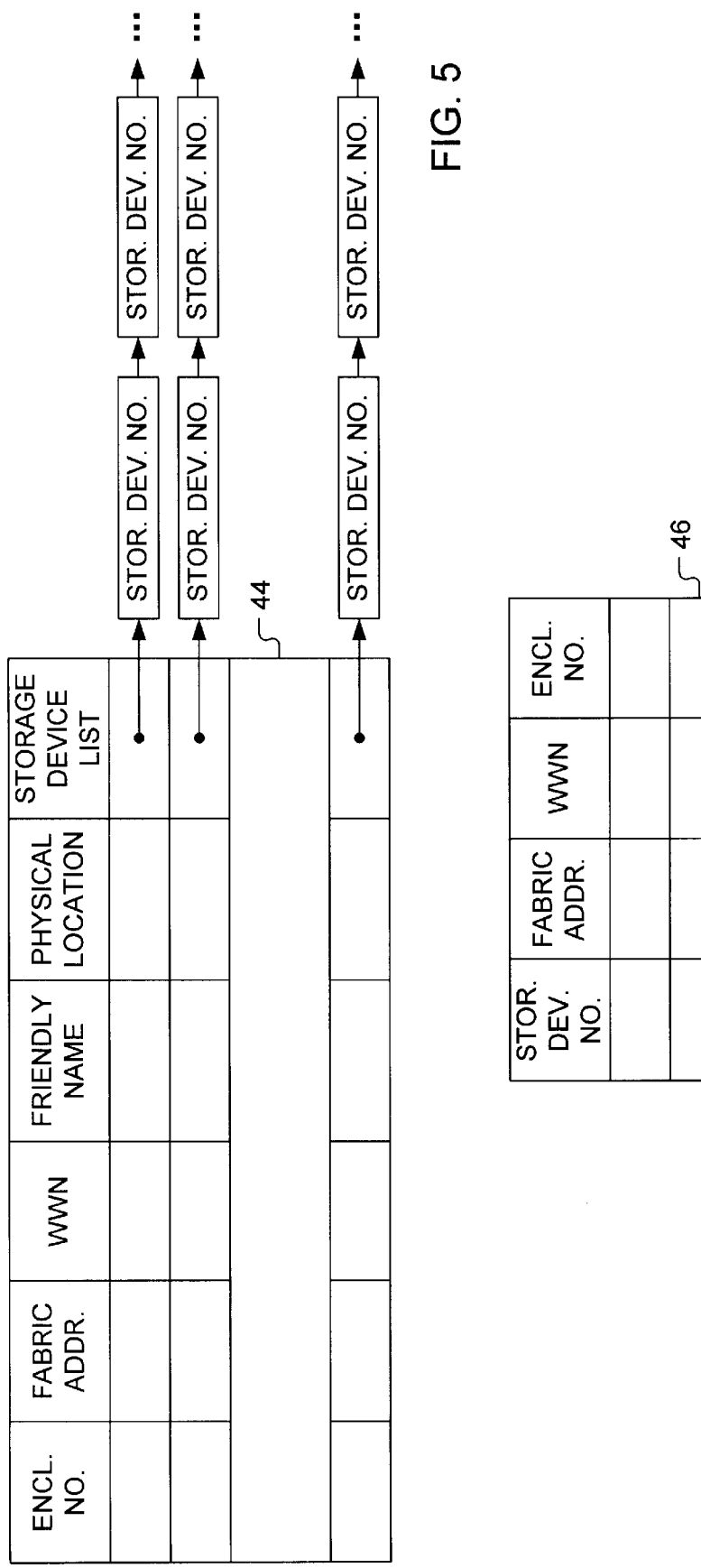

METHODS FOR BUILDING AND USING A NETWORK DEVICE DATABASE

BACKGROUND OF THE INVENTION

1. Field of the Invention

This invention relates to computer systems and networks, and more particularly to computer data storage networks including multiple data storage devices.

2. Description of the Related Art

Two or more devices or systems are often linked together to form a network. Well known types of computer networks include local area networks (LANs) and wide area networks (WANs). Devices or systems that allocate resources for a network are called servers.

A storage area network (SAN) is a network of data storage devices (i.e., storage devices). Examples of storage devices include hard disk drives, compact disk read only memory (CD-ROM) drives, and tape drives. A SAN may be coupled to another network such as a LAN or WAN. In this case, the SAN is typically configured such that all storage devices are available to all servers on the LAN or WAN, and the servers act as pathways between end users and stored data.

The small computer system interface (SCSI) is a popular parallel interface standard used by many different types of computer systems for interfacing to peripheral devices (e.g., storage devices). Multiple devices can be connected to a single SCSI port.

Fibre Channel is a serial data transfer architecture standardized by the American National Standards Institute (ANSI). The most prominent Fibre Channel standard is the Fibre Channel Arbitrated Loop (FC-AL). FC-AL was designed for mass storage devices and other peripheral devices that require relatively high data bandwidth.

Fibre Channel supports its own as well as other higher level protocols including the SCSI protocol. Due to the popularity of the SCSI protocol, it is currently common practice to use fibre channel technology to convey established SCSI commands via the fibre channel protocol for SCSI standard (ANSI X3.269-1996). Employing FC-AL loop technology to convey SCSI command packets allows the command packets to be transmitted at higher speeds while minimizing required modifications to existing SCSI-based driver software.

Fibre Channel fabrics allow for millions of devices to be connected to one or more computer systems. In the case of a SAN including a relatively large number of storage devices, a problem arises in that locating a faulty storage device can be a difficult task. SAN storage devices are typically positioned within enclosures housing multiple storage devices. These enclosures are typically distributed about a facility (e.g., near end users). In addition, the physical locations of storage devices within enclosures, and the enclosures themselves, tend to change over time. As a result, knowledge of the physical locations of individual storage devices, and even enclosures, is often lost.

Further, a particular storage device is typically accessed using an address of the storage device. The address of the storage device may change when the enclosure housing the storage device is relocated, or when the storage device is moved from one enclosure to another. Without knowledge of the current address of a faulty storage device, the faulty storage device becomes inaccessible for remote shutdown and/or troubleshooting.

SUMMARY OF THE INVENTION

Several methods are described for building and using a network device database. The network includes multiple enclosures, and each enclosure houses at least one device (e.g., a data storage device). The network may be, for example, a storage area network.

One embodiment of a method for deriving the addresses of all devices of the network includes repeating the following steps for each enclosure of the network. A command is issued to the enclosure requesting information comprising device identifications (IDs) of all devices within the enclosure. A portion of an address of the enclosure is concatenated with each device ID to form the addresses of all devices within the enclosure.

The network may include one or more Fibre Channel Arbitrated Loops (FC-ALs). In this case, the addresses of the enclosures and the devices coupled FC-ALs are fabric addresses.

Each enclosure may include a small computer system interface (SCSI) enclosure services (SES) unit. In this case, the issuing step may include issuing a command to the SES unit of an enclosure requesting a page of information including device IDs of all devices within the enclosure. The page may be an SES-defined element descriptor page. Such an element descriptor page includes an element descriptor for each device within the enclosure, and each element descriptor includes the device ID of a corresponding device within the enclosure. The above method may thus include extracting the device IDs of all devices in the enclosure from the information.

The address of the enclosure may be the address of the SES unit of the enclosure. In this case, the concatenating step may include concatenating a loop address of the SES unit of the enclosure with the device ID of each device within the enclosure to form the addresses of all devices within the enclosure. The loop address of the SES unit of the enclosure may include the two most significant bytes of an address of the SES unit. The concatenating is accomplished such that the loop address of the SES unit of the enclosure forms a higher order portion of the address of a given device, and the device ID of the device forms a lower ordered portion of the address of the given device.

The above method may be used to build a device database by storing the addresses of all devices within each enclosure of the network. The storing may include repeating the following steps for each device within each enclosure of the network. An entry is allocated in a table (e.g., in a device table of the database). A device number is generated and associated with the device. The device number is stored in a device number column of the entry, and the address of the device is stored in an address column of the entry. A different device number is preferably generated for each device within the enclosure. An enclosure number assigned to the enclosure housing the device may be stored in an enclosure number column of the entry.

One embodiment of a method for handling a fault condition within a device of the above described network includes building a database including addresses of all enclosures and devices of the network. A device ID of a device with a fault condition is received. A portion of an address of an enclosure housing the device is concatenated with the device ID to form the address of the device with the fault condition. The database is accessed using the address of the device to obtain information regarding the physical location of the enclosure housing the device with the fault condition. The method may also include presenting the information regarding the physical location of the enclosure housing the device with the fault condition to a user.

Where each enclosure includes an SES unit, the address of the enclosure may be the address of the SES unit of the enclosure. In this case, the concatenating may include concatenating the loop address of the SES unit of the enclosure with the device ID of the device with the failure to form the address of the device with the fault condition. The concatenating is accomplished such that the loop address of the SES unit of the enclosure forms a higher order portion of the address of the device with the fault condition, and the device ID of the device with the fault condition forms a lower ordered portion of the address of the device with the fault condition.

The method may also include using the address of the device to issue one or more commands to the device with the fault condition. The one or more commands may include a shutdown command and/or a command which causes the device with the fault condition to flash a light on a display panel of the enclosure.

The database may include an enclosure table and a device table. The enclosure table may include the addresses of all enclosures of the network, and the device table may include the addresses of all devices of the network.

The enclosure table may also include information regarding the physical location of all enclosures of the network. In this case, the accessing step of the above method may include searching the enclosure table using the address of the enclosure housing the device with the fault condition. The information regarding the physical location of the enclosure housing the device with the fault condition may be obtained from an entry of the enclosure table including the address of the enclosure housing the device with the fault condition.

The enclosure table may also include a friendly name of each enclosure of the network. In this case, the friendly name of the enclosure housing the device with the fault condition may also be obtained from the enclosure table during the accessing step, and presented to the user along with the information regarding the physical location of the enclosure housing the device with the fault condition.

A described network includes multiple enclosures, each housing one or more devices, and a host coupled to each of the enclosures. The host is configured to: (i) issue a command to a given one of the enclosures requesting information comprising device identifications (IDs) of all devices within the given enclosure, and (ii) concatenate a portion of an address of the given enclosure with the device IDs of all of the devices within the given enclosure to form addresses of all of the devices within the given enclosure.

The above described methods may be embodied as program instructions, and performed as a result of executing the program instructions. For example, the host may be a computer system including a central processing unit (CPU) executing program instructions of SAN host software, and the SAN host software may embody the above described methods. In this case, the host performs the steps of the above described methods as the CPU executes the program instructions of the SAN host software. The program instructions may be embodied within a carrier medium (e.g., a computer-readable storage medium such as a floppy disk or a compact disk read only memory, CD-ROM, disk). The carrier medium may be used to convey the program instructions to the host.

BRIEF DESCRIPTION OF THE DRAWINGS

FIG. 5 is a diagram of one embodiment of the enclosure table of FIG. 3, wherein the enclosure table includes multiple entries, and wherein each entry has a column for an enclosure number, a fabric address, a world wide name (WWN), a "friendly" name, a physical location, and a storage device list;

FIG. 6 is a diagram of one embodiment of the device table of FIG. 3, wherein the device table includes multiple entries, wherein each entry has a column for a storage device number, a fabric address, a world wide name (WWN), and an enclosure number;

Figure 1:
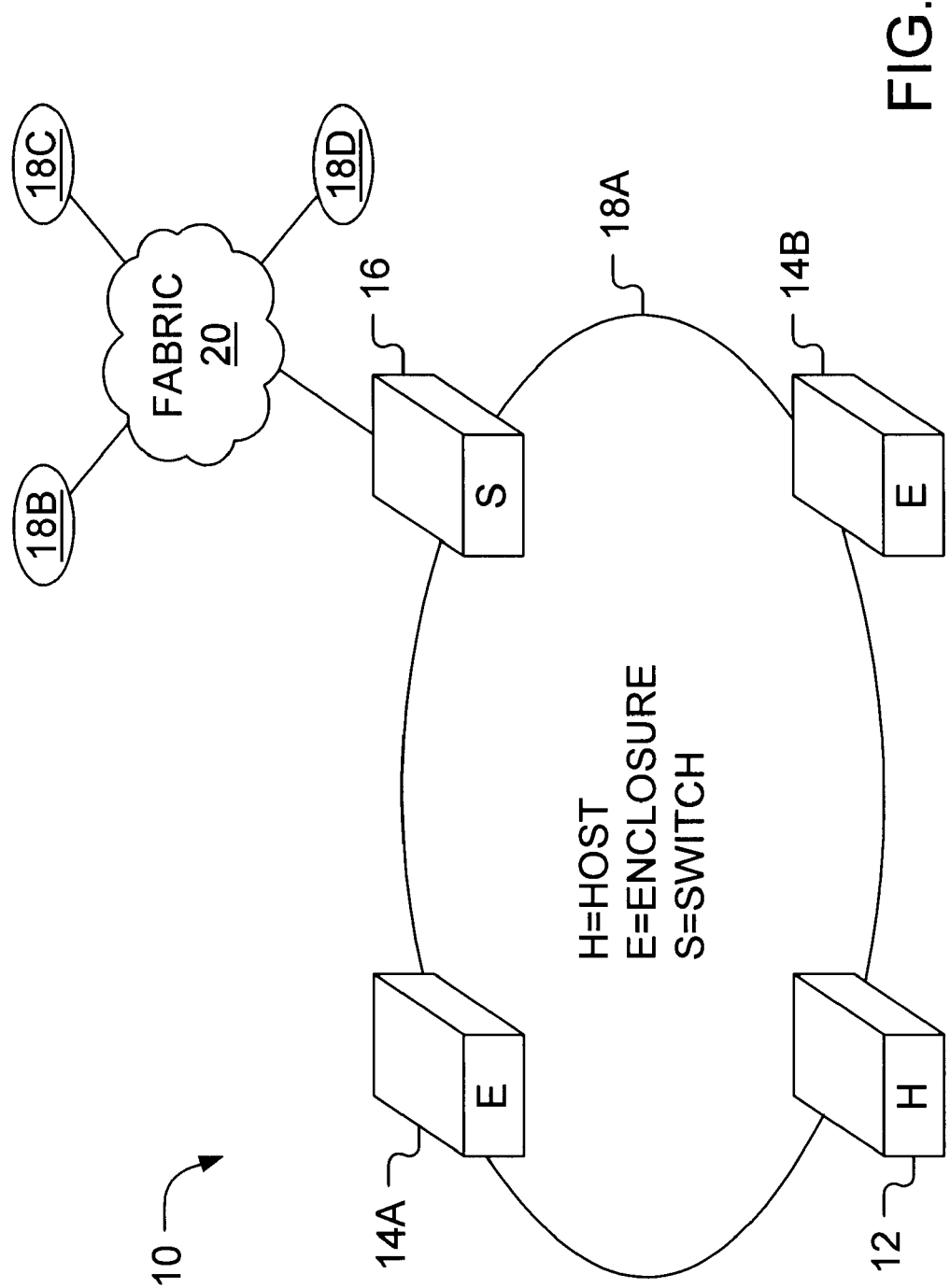
FIG. 1 is a diagram of one embodiment of an exemplary storage area network (SAN) including a host, two enclosures, and a switch coupled in serial "daisy chain" fashion to form an arbitrated loop.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

FIG. 1 is a diagram of one embodiment of an exemplary storage area network (SAN) 10 including a host 12, two enclosures 14A and 14B, and a switch 16 coupled in serial "daisy chain" fashion to form an arbitrated loop 18A. Enclosures 14A and 14B house multiple data storage devices (i.e., storage devices). Host 12 issues data access commands (e.g., read and write commands) to the storage devices of SAN 10 via arbitrated loop 18A.

Switch 16 couples arbitrated loop 18A to a fabric 20, and fabric 20 is coupled to multiple arbitrated loops 18B–18D. Fabric 20 may include, for example, two or more switches which couple arbitrated loops 18B–18D to one another. Additional hosts and/or enclosures may be coupled together to form arbitrated loops 18B–18D. Thus in addition to host 12, enclosures 14A–14B, and switch 16 of arbitrated loop 18A, SAN 10 also includes components of fabric 20 and all hosts and/or enclosures of arbitrated loops 18B–18D.

Due to the popularity of the SCSI protocol, it is currently common practice to use Fibre Channel technology to convey established SCSI commands via the Fibre Channel protocol for SCSI standard (ANSI X3.269-1996). Employing FC-AL loop technology to convey SCSI command packets allows the command packets to be transmitted at higher speeds while minimizing required modifications to existing SCSI-based driver software. Accordingly, arbitrated loops 18A–18D may be Fibre Channel Arbitrated Loops (FC-ALs), and may employ the Fibre Channel protocol for SCSI standard (ANSI X3.269-1996). In this case, host 12 issues SCSI commands to the storage devices of SAN 10 via arbitrated loop 18A. If host 12 issues a SCSI command to a storage device of arbitrated loop 18B, 18C, or 18D, switch 16 and fabric 20 route the command to the appropriate arbitrated loop 18.

Host 12, enclosures 14A and 14B, and switch 16 form separate nodes or modules of arbitrated loop 18A, and data flows in a single direction around arbitrated loop 18A. A transmission medium coupling the separate nodes or modules of arbitrated loop 18A to each other includes multiple sections, each section forming a point-to-point connection between an output of one module and an input of another module. Each module receives commands and/or data from a predecessor or "upstream" module via one section of the transmission medium, and sends commands and/or data to a successor or "downstream" module via another section of the transmission medium.

Figure 2:
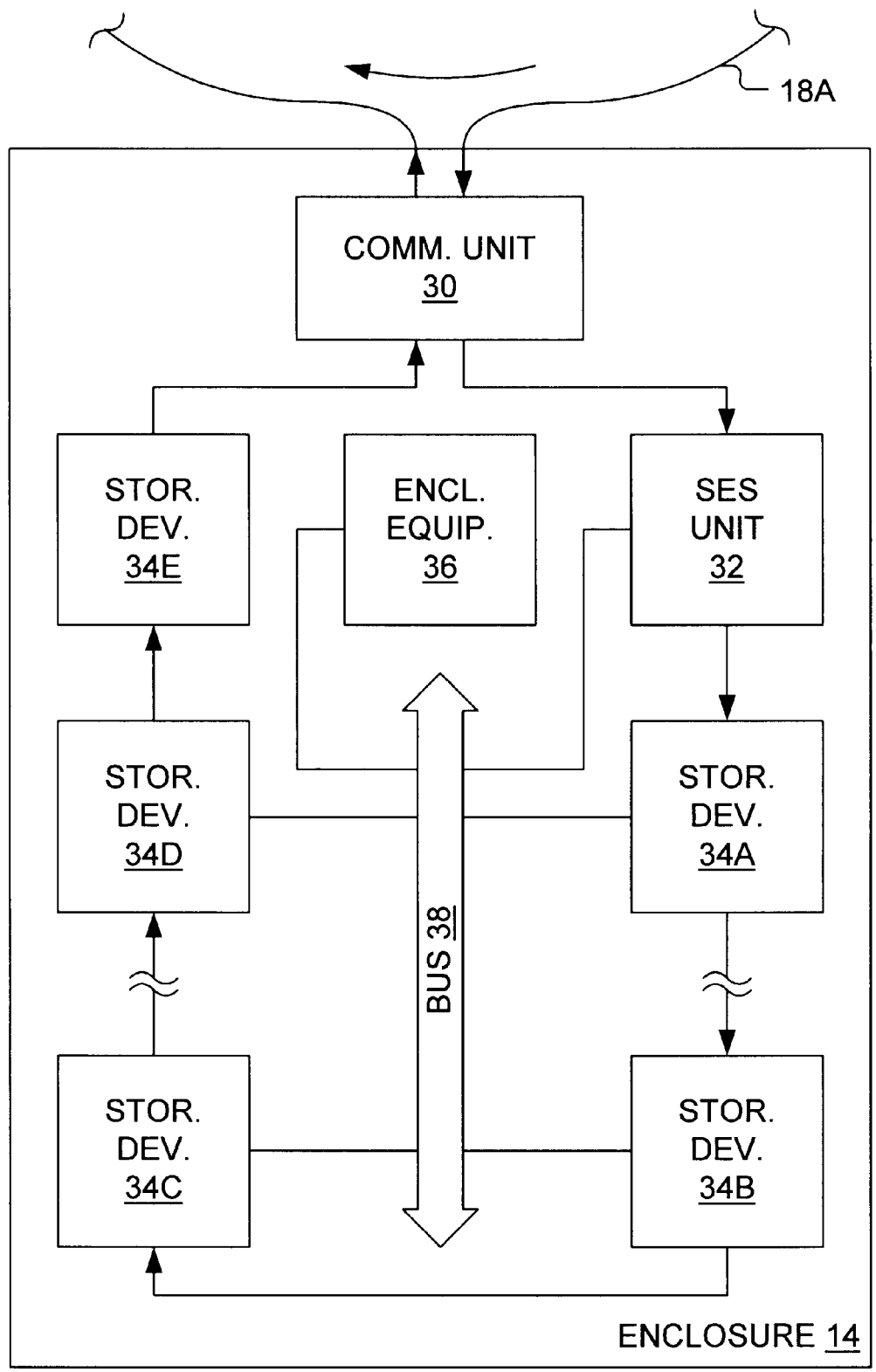
FIG. 2 is a diagram of one embodiment of a representative enclosure of FIG. 1, wherein the representative enclosure includes a communication unit, a SCSI enclosure services (SES) unit, multiple storage devices, enclosure equipment, and a bus.

FIG. 2 is a diagram of one embodiment of a representative enclosure 14 of FIG. 1. In the embodiment of FIG. 2, representative enclosure 14 includes a communication unit 30, a SCSI enclosure services (SES) unit 32, multiple storage devices 34A–34E, enclosure equipment 36, and a bus 38. Storage devices 34A–34E may be, for example, hard disk drives.

Communication unit 30 includes an input port coupled to one section of the transmission medium of arbitrated loop 18A, and an output port connected to another section of the transmission medium. Within enclosure 14, SES unit 32 and storage devices 34A–34E are coupled in serial fashion to form a device chain having an input end and an output end. During normal operation of enclosure 14, communication unit 30 couples the input end of the device chain to the input port and the output end of the device chain to the output port. Thus during normal operation of enclosure 14, SES unit 32 and storage devices 34A–34E form a part of loop 18A. A device of loop 18A receiving a command not directed to the device merely passes the command on. When enclosure 14 is non-operational, communication unit 30 couples the input port to the output port such that loop 18A remains intact.

SES unit 32 is also coupled to storage devices 34A–34E and enclosure equipment 36 via bus 38. Enclosure equipment 36 may include, for example, one or more power supplies for providing electrical power to storage devices 34A–34E, one or more fans for providing a flow of cooling air within enclosure 14 to cool storage devices 34A–34E, one or more temperature sensors for monitoring the temperature within enclosure 14, and a display panel for displaying enclosure status information. SES unit 32 accesses storage devices 34A–34E and components of enclosure equipment 36 via bus 38 (e.g., by periodic polling) in order to gather enclosure status information. SES unit 32 receives commands of a SCSI enclosure command set (e.g., an ANSI standard SES command set) via loop 18A, and executes the SES commands. In executing the SES commands, SES unit 32 controls components of enclosure equipment 36 via bus 38 and provides enclosure status information. SES unit 32 may include hardware and/or software. For example, in response to an SES command received via loop 18A, SES unit 32 may shut down a power supply of enclosure equipment 36 via bus 38.

Figure 3:
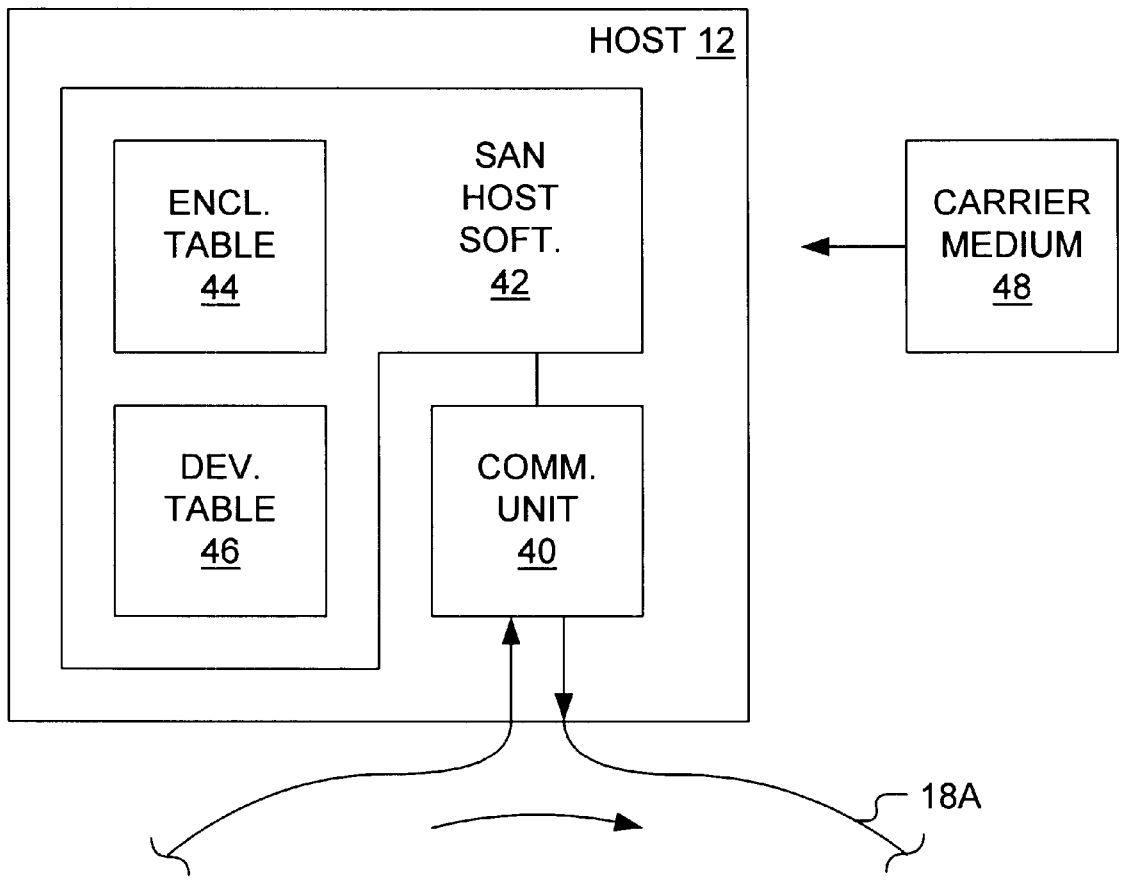
FIG. 3 is a diagram of one embodiment of the host of FIG. 1, wherein the host includes a communication unit coupled to SAN host software, and wherein the SAN host software includes an enclosure table and a device table.

FIG. 3 is a diagram of one embodiment of host 12 of FIG. 1. In the embodiment of FIG. 3, host 12 includes a communication unit 40 coupled to SAN host software 42. Communication unit 40 is coupled to the transmission medium of arbitrated loop 18A. Communication unit 40 includes an input coupled to one section of the transmission medium, and an output connected to another section of the transmission medium.

SAN host software 42 may be used to configure and manage SAN 10. Host 12 may be a computer system including a central processing unit (CPU). SAN host software 42 includes software program instructions which may be executed by the CPU of host 12. SAN host software 42 includes instructions for issuing data access commands (e.g., read and write commands) to the storage devices of SAN 10. SAN host software 42 may receive data access requests from application software programs via an operating system of host 12, and may respond to such data access requests by issuing data access commands to the storage devices of SAN 10.

In the embodiment of FIG. 3, SAN host software 42 also includes instructions for building a SAN database including an enclosure table 44 and a device table 46. The SAN database reflects the current configuration of SAN 10. SAN host software 42 preferably includes instructions for presenting the current configuration of SAN 10 to a user of SAN 10 (e.g., a system administrator). For example, SAN host software 42 may include instructions for displaying the current configuration of SAN 10 upon a display screen of a display device of host 12.

SAN host software 42 may be embodied within a carrier medium 48, and may be conveyed to host 12 via carrier medium 48. For example, host 12 may include a floppy disk drive, and carrier medium 48 may be a floppy disk. SAN host software 42 embodied within the floppy disk may be conveyed to host 12 inserting the floppy disk in the floppy disk drive and reading SAN host software 42 from the floppy disk. Alternately, host 12 may include a compact disk read only memory (CD-ROM) disk drive, and carrier medium 48 may be a CD-ROM disk. Carrier medium 48 may also be any other type of computer-readable storage medium.

Figure 4:
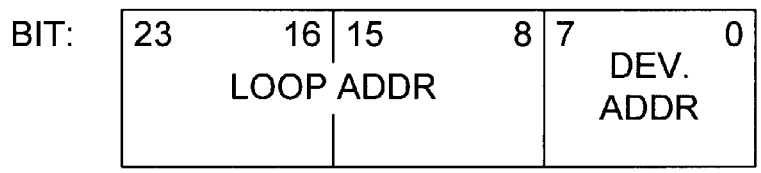
FIG. 4 is a diagram of one embodiment of a format of a fabric address assigned to components of the SAN of FIG. 1, wherein the SES unit of each enclosure and each storage device of the SAN has a unique 24-bit (3 byte) fabric address, and wherein the most significant (e.g., higher ordered) 16 bits (2 bytes) of a given fabric address specify a "loop address", and wherein the least significant (e.g., lower ordered) 8 bits (1 byte) of the fabric address specify a "device address"

FIG. 4 is a diagram of one embodiment of a format of a fabric address assigned to components of SAN 10. In the embodiment of FIG. 4, the SES unit of each enclosure and each storage device of SAN 10 has a unique 24-bit (3 byte) fabric address. The most significant (e.g., higher ordered) 16 bits (2 bytes) of a given fabric address specify a "loop address". Each arbitrated loop of SAN 10 has a different loop address, thus SAN 10 can have up to $2^{16}$ or 65,536 different arbitrated loops. The least significant (e.g., lower ordered) 8 bits (1 byte) of the fabric address specify a "device address". The SES unit of each enclosure and each storage device of a given loop (specified by the loop address) has a unique device address within the loop. Theoretically, each loop can include up to $2^8$ or 256 different devices. However, FC-AL loops are limited by the FC-AL standard (ANSI X3.272-1996) to a maximum of 127 different devices.

For example, devices coupled to an FC-AL loop having a loop address where the most significant byte is '32h' (hexadecimal) and the next most significant byte is '07h' may have fabric addresses of '32.7.x' where x is different for each device and ranges between '0' and '7F' (where bit 7 of the device address is always '0').

FIG. 5 is a diagram of one embodiment of enclosure table 44 of FIG. 3. In the embodiment of FIG. 5, enclosure table 44 includes multiple entries, and wherein each entry has a column for an enclosure number, a fabric address, a world wide name (WWN), a "friendly" name, a physical location, and a storage device list. As will be described below, enclosure numbers are assigned to enclosures by SAN host software 42 during loop initialization, and may have no physical significance.

During loop initialization, all units of each enclosure, including the SES unit and storage devices, provide their fabric address to SAN host software 42. (Unfortunately, the fabric addresses are not provided in manner which allows SAN host software 42 to determine which storage devices exist in each enclosure.) Upon receiving the fabric address of the SES unit of a given enclosure during loop initialization, SAN host software 42 may allocate an entry in enclosure table 44 for the enclosure. SAN host software 42 may generate an enclosure number for the enclosure (e.g., by incrementing a number assigned to a previous enclosure), and store the enclosure number in the enclosure number column of the entry. SAN host software 42 may also store the fabric address of the SES unit of the enclosure in the fabric address column of the entry.

Each SES unit of each enclosure of SAN 10 has a WWN permanently stored therein. The WWN of a device is currently a 64-bit binary number which uniquely identifies the device. It is noted that while the fabric address of a given device may change (e.g., during a reconfiguration of SAN 10), the WWN of the given device never changes.

At some time after loop initialization, SAN host software 42 may obtain the WWN of the SES unit of each enclosure of SAN 10 via queries to the SES units, and store the WWNs of the SES units of the enclosures in the WWN column of the respective entries of enclosure table 44. For example, SAN host software 42 may issue a SCSI command to the SES unit of each enclosure of SAN 10 requesting an SES-defined "string in" page (page 04h) from the enclosures. Upon receiving a given page 04h, SAN host software 42 may extract the WWN of the SES of the enclosure from bytes 8–15 of page 04h, the "World Wide Name" field. SAN host software 42 may store the WWN of the SES in the WWN column of the corresponding entry of enclosure table 44.

The user may assign each enclosure of SAN 10 a "friendly" name which helps the user identify the enclosure. The friendly name may be, for example, an alphanumeric string such as "FRED", "ZEUS", or "BAT21". The friendly name of an enclosure may be substituted for a frame address of the enclosure by SAN host software 42 when interfacing with the user as alphanumeric strings are typically more recognizable to users and generally preferred over numeric fabric addresses.

The user may assign a friendly name to each enclosure of SAN 10 remotely via SAN host software 42. The user may also be able to assign a friendly name to a given enclosure locally via a keypad of the display panel of enclosure equipments 36 of the enclosure 14 (see FIG. 2). The friendly name assigned to a given enclosure may be stored in a memory of the SES unit of the given enclosure. When the user assigns a friendly name to an enclosure via SAN host software 42, SAN host software 42 may convey the assigned friendly name to the SES unit of the enclosure for storage in the memory. SAN host software 42 may also store the friendly name of the enclosure in the friendly name column of the corresponding entry of enclosure table 44.

At some time after loop initialization, SAN host software 42 may query the SES unit of each enclosure of SAN 10 having no friendly name listed in the friendly name column of the corresponding entry of enclosure table 44. SAN host software 42 may store a friendly name received from an SES unit in the friendly name column of the corresponding entry of enclosure table 44. If the enclosure has no friendly name assigned, SAN host software 42 may prompt the user to assign a friendly name to the enclosure as described above.

For example, SAN host software 42 may issue the SCSI command to the SES unit of each enclosure of SAN 10 requesting the "string in" page (page 04h) from the enclosures as described above. Upon receiving a page 04h from an enclosure having no friendly name listed in the friendly name column of the corresponding entry of enclosure table 44, SAN host software 42 may extract the friendly name of the enclosure from bytes 28–59 of page 04h, the "enclosure name" field, and store the friendly name in the friendly name column of the corresponding entry of enclosure table 44.

At some time after loop initialization, SAN host software 42 may prompt the user to provide physical location information for each enclosure of SAN 10. The physical location information helps the user locate the enclosure when necessary. This is especially important where SAN 10 is relatively large and has several enclosures in many different locations. The physical location information may be, for example, an alphanumeric string such as "COMPUTER ROOM", "ENGINEERING LIBRARY", or "3RD FLOOR STAIRWELL". SAN host software 42 may store physical location information provided by the user in the physical location columns of the respective entries of enclosure table 44. Once stored in enclosure table 44, SAN host software 42 may present the physical location of a given enclosure to the user in situations where the user may need to physically access the enclosure.

The storage device list column of each entry of enclosure table 44 is used to store a list of the storage devices within the corresponding enclosure. In the embodiment of FIG. 5, the storage device lists are implemented as linked lists. The storage device list column of each entry contains a pointer to serial chain of linked list elements. Each linked list element includes a storage device number assigned to a different storage device within the corresponding enclosure. As will be described below, storage device numbers are assigned to storage devices by SAN host software 42 during loop initialization, and may have no physical significance.

FIG. 6 is a diagram of one embodiment of device table 46 of FIG. 3. In the embodiment of FIG. 6, device table 44 includes multiple entries, wherein each entry has a column for a storage device number, a fabric address, a world wide name (WWN), and an enclosure number. At some time after loop initialization, SAN host software 42 completes device table 46 by querying the SES units of the enclosures of SAN 10 during a database building operation.

Figure 7:
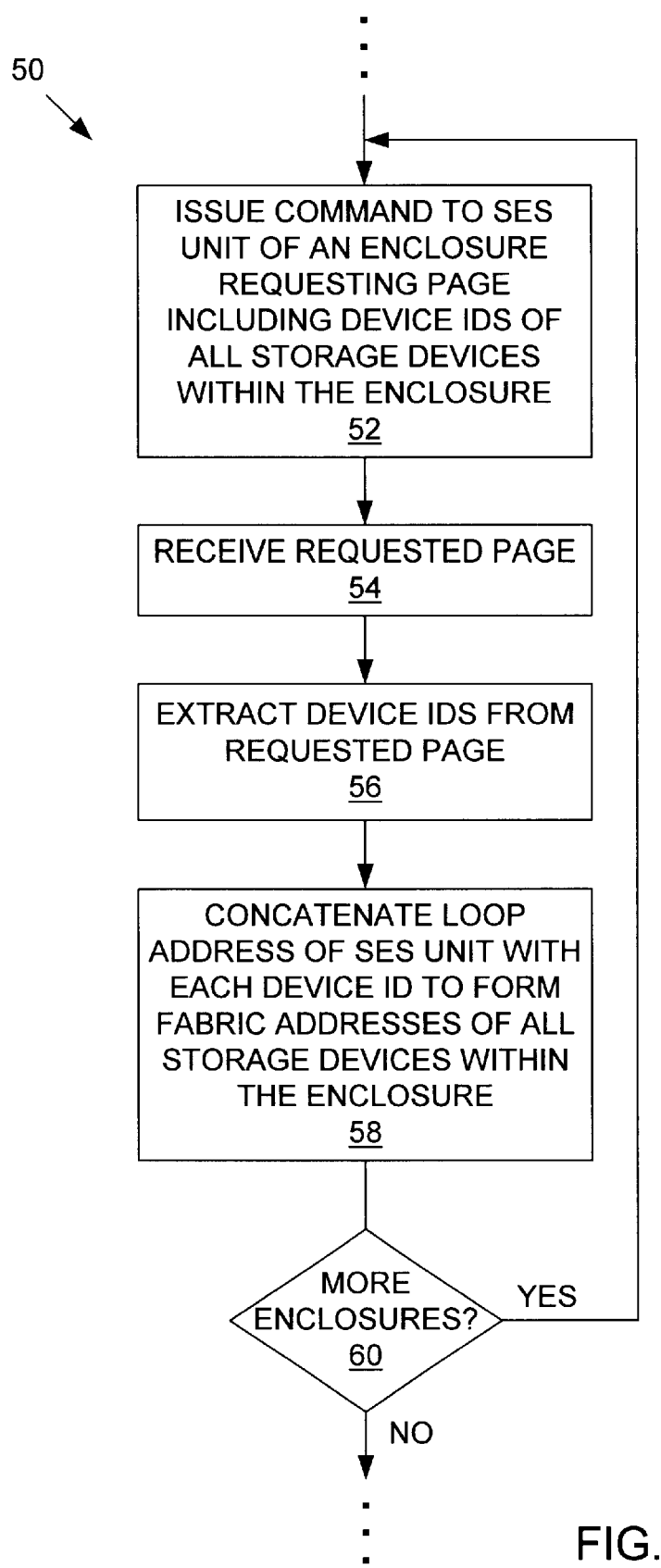
FIG. 7 is a flow chart of a method for deriving the fabric addresses of all storage devices of the SAN of FIG. 1.

FIG. 7 is a flow chart of a method 50 for deriving the fabric addresses of all storage devices of SAN 10. Method 50 may be embodied within SAN host software 42. In this case, during a step 52, SAN host software 42 issues a command to the SES unit of an enclosure requesting a "page" of information including the device IDs of all storage devices within the enclosure. The page may be, for example, an SES-defined "element descriptor" page (page 07h). The requested page is received during a step 54.

During a step 56, SAN host software 42 extracts the device IDs of all storage devices in the enclosure from the requested page. For example, a given page 07h includes a 4-byte element descriptor for each storage device in the corresponding enclosure. A "slot address" byte of a given element descriptor is the device ID of the corresponding storage device. SAN host software 42 may thus extract the device IDs of all storage devices in an enclosure from respective "slot address" bytes of element descriptors of the corresponding page 07h.

During a step 58, SAN host software 42 concatenates the loop address of the SES unit of the enclosure (the two most significant bytes of the fabric address of the corresponding entry in enclosure table 44) with each device ID to form the fabric addresses of all storage devices within the enclosure. For example, assume an SES unit of an enclosure has a fabric address where the most significant byte is '32h', the next most significant byte is '07h', and the least significant byte is '20h'. The loop address of the SES unit of the enclosure is thus '32.7'. Also assume the corresponding page 07h received by SAN host software 42 includes three element descriptors with slot address bytes '21h', '22h', and '23h'. The corresponding three storage devices of the enclosure thus have fabric addresses '32.7.21', '32.7.22', and '32.7.23'.

Following step 58, SAN host software 42 may allocate an entry in device table 46 for each storage device within the enclosure. SAN host software 42 may generate a different storage device number for each storage device, and store the storage device numbers in the storage device number columns of the respective entries of device table 46. SAN host software 42 may store the fabric address of each storage device in the fabric address column of the corresponding entry. SAN host software 42 may also store the enclosure number from enclosure table 44 in the enclosure number column of each newly allocated storage device entry. It is noted that the enclosure numbers form links between entries of enclosure table 44 and corresponding entries of device table 46.

The above steps may be repeated for each enclosure of SAN 10 (e.g., having an entry in enclosure table 44). In this manner, the fabric addresses of all storage devices of SAN 10 may be derived.

Each storage device of SAN 10 has a WWN permanently stored therein. SAN host software 42 may complete device table 46 by obtaining the WWN of each device of SAN 10 via queries to the devices, and storing the WWNs of the devices in the WWN column of the respective entries of device table 46.

For example, SAN host software 42 may issue a SCSI command to each device of SAN 10 requesting a SCSI "device identification" page (page 83h) from the device. A given page 83h may include a variable length identification descriptor for the corresponding storage device. When the identifier type field of a given identification descriptor contains the value '3h', the "identifier" field of the identification descriptor is the WWN of the corresponding storage device. Upon receiving a given page 83h, SAN host software 42 may extract the WWN of the corresponding storage device from the identifier field of the identification descriptor. SAN host software 42 may store the WWN of the storage device in the WWN column of the corresponding entry of device table 46.

Once SAN host software 42 has completed method 50 and created entries in device table 46 for all storage devices of SAN 10, SAN host software 42 may use device table 46 to fill in the storage device list columns of the entries of enclosure table 44. Beginning with a first entry in device table 46, SAN host software 42 may use the enclosure number in the enclosure number column of the entry to find the corresponding entry in enclosure table 44. SAN host software 42 may then add the storage device number in the storage device column of the entry in device table 44 to the storage device list column of the corresponding entry in enclosure table 44. In the embodiment of FIG. 5 where the storage device lists are implemented as linked lists, this may involve creating a new linked list element, storing the storage device number in the linked list element, and adding the linked list element to the linked list. The above steps may be repeated for all remaining entries of device table 46 in order to complete enclosure table 44. It is noted that like the enclosure numbers, the storage device numbers form links between entries of enclosure table 44 and corresponding entries of device table 46.

Figure 8A:
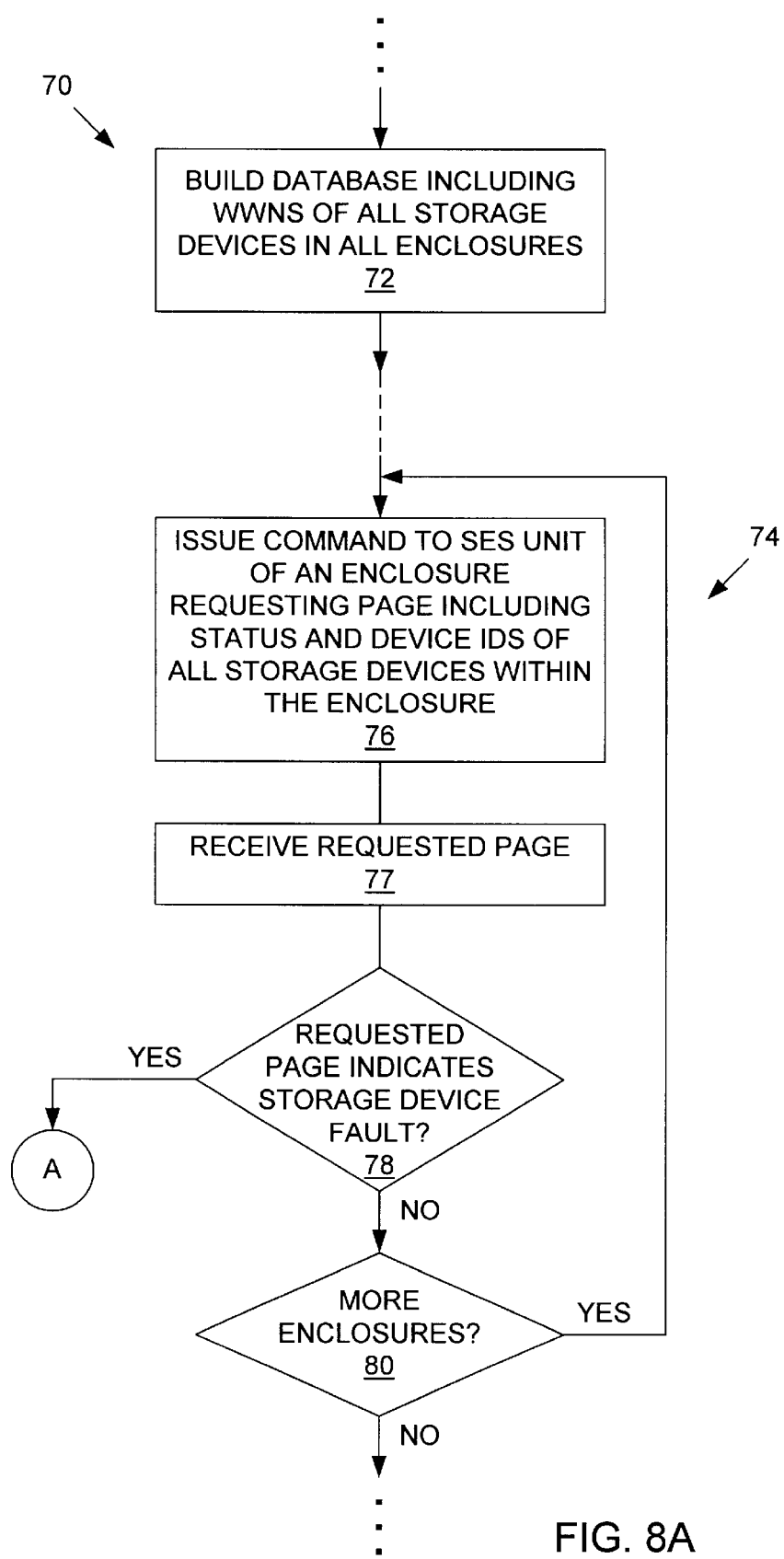
FIGS. 8A and 8B together form a flow chart of one embodiment of a method for handling a fault condition within a storage device of the SAN of FIG. 1.
Figure 8B:
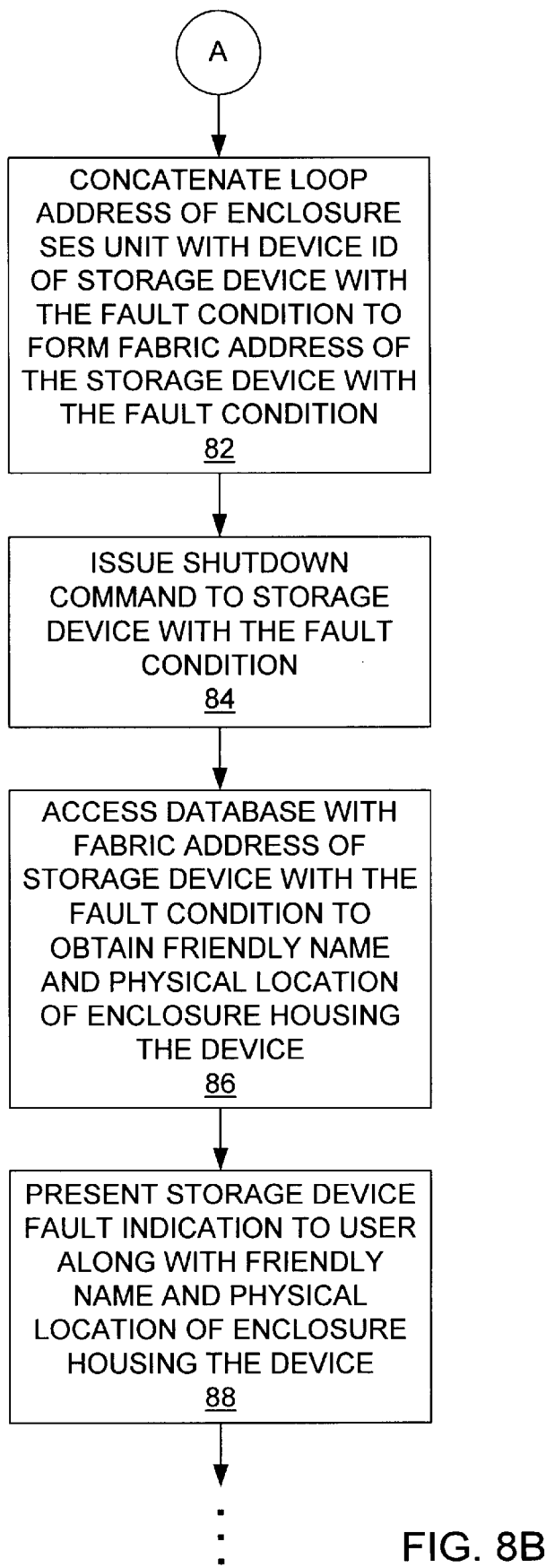

FIGS. 8A and 8B together form a flow chart of one embodiment of a method 70 for handling a fault condition within a storage device of SAN 10 (e.g., a failure of a storage device of SAN 10). Method 70 involves using information stored in enclosure table 44 and device table 46 of FIGS. 3 and 5–6. Method 70 may be embodied within SAN host software 42 (FIG. 3). In this case, during a step 72, SAN host software 42 builds the above described SAN database including enclosure table 44 and device table 46. As described above, enclosure table 44 includes the friendly names and physical locations of all enclosures of SAN 10, and device table 46 includes the WWNs of all storage devices of SAN 10.

A portion 74 of method 70 includes steps 76, 77, 78, and 80, and represents a polling approach to detecting failures of storage devices of SAN 10. Portion 74 may be performed periodically by SAN host software 42. During step 76, SAN host software 42 issues a command to an SES unit of an enclosure requesting a "page" of information including the status and device IDs of all storage devices within the enclosure. For example, the SES-defined "element descriptor" page (page 07h) includes a 4-byte element descriptor for each storage device in the corresponding enclosure as described above. A "fault sensed" bit of an element descriptor is set when a fault condition is detected in the corresponding storage device. SAN host software 42 may thus issue a SCSI command to the SES unit of the enclosure requesting a page 7h be returned by the SES unit.

The requested page is received during a step 77, and the requested page is checked for an indication of a storage device with a fault condition during a decision step 78. For example, SAN host software 42 may check the "fault sensed" bits of all element descriptors of a returned page 07h. If a "fault sensed" bit of any of the element descriptors is set, a fault condition exists in the corresponding storage device, and SAN host software 42 may continue with a step 82 of method 70 (FIG. 8B). If the "fault sensed" bit is not set in any of the element descriptors, a decision step 80 is next performed. Step 80 ensures steps 76, 77, and 78 are repeated for all enclosures of SAN 10.

During step 82, SAN host software 42 may concatenate the loop address of the SES unit of the enclosure (from the fabric address column of the corresponding entry of enclosure table 44) with the device ID of the storage device to form the fabric address of the storage device with the fault condition. For example, the "slot address" byte of the element descriptor including the set "fault sensed" bit includes the device ID of the storage device with the fault condition. SAN host software 42 need only concatenate the loop address of the SES unit of the enclosure with the contents of the "slot address" byte of the element descriptor including the set "fault sensed" bit to form the fabric address of the storage device with the fault condition.

During a step 84, SAN host software 42 issues a shutdown command to the storage device with the fault condition. SAN host software 42 may also, for example, issue a command to the storage device which causes the storage device to flash a light on a display panel of the enclosure equipment 36 of the corresponding enclosure 14 (see FIG. 2).

During a step 86, SAN host software 42 accesses the SAN database with the fabric address of the storage device with the fault condition to obtain the friendly name and the physical location of the enclosure housing the storage device. For example, SAN host software 42 may search the fabric addresses in the fabric address columns of the entries of device table 46 for the fabric address of the storage device with the fault condition. When a match is found in an entry of device table 46, the enclosure number in the enclosure number column of the entry is the enclosure number of the enclosure housing the storage device with the fault condition. SAN host software 42 may then search the enclosure numbers in the enclosure number columns of the entries of enclosure table 44 for the enclosure number of the enclosure housing the storage device with the fault condition. When a match is found in an entry of device table 46, the friendly name in the friendly name column of the entry is the friendly name of the enclosure housing the storage device with the fault condition, and the physical location in the physical location column of the entry is the physical location of the enclosure housing the storage device with the fault condition.

During a step 88, SAN host software 42 presents a storage device indication to the user along with the friendly name and the physical location of the enclosure housing the storage device with the fault condition. For example, SAN host software 42 may display an error message upon a display screen of a display device of host 12. The error message may state that a storage device of SAN 10 has failed, and give the friendly name and the physical location of the enclosure housing the storage device with the fault condition.

It is noted that SAN management software 42 may also retrieve the WWN of the storage device with the fault condition from the SAN database during method 70. As the WWN of a device never changes, the WWN of a device is the logical choice for identifying the device for record keeping. The WWN of the storage device with the fault condition may thus be used to record the occurrence of the failure. For example, when SAN host software 42 searches the entries of device table 46 during step 86 and locates the entry corresponding to the storage device with the fault condition, SAN management software 42 may obtain the WWN of the storage device with the fault condition from the WWN column of the entry.

It is also noted that the building of the SAN database in step 72 may be performed after a failure of a storage device is detected in step 78. However, while some types of failures may not prevent the building of the SAN database (e.g., non-volatile memory failure), other types of failures may prevent the building of the SAN database. For example, a failure which prevents a device from providing needed information (e.g., its WWN) may prevent the building of the SAN database. It is therefore desirable to build the SAN database, including enclosure table 44 and device table 46, while all storage devices of SAN 10 are operational.

Numerous variations and modifications will become apparent to those skilled in the art once the above disclosure is fully appreciated. It is intended that the following claims be interpreted to embrace all such variations and modifications.

What is claimed is:

1. A method for deriving the addresses of all devices of a network, wherein the network comprises a plurality of enclosures, and wherein each enclosure houses at least one device, the method comprising:
   repeating the following steps for each enclosure of the network:
      issuing a command to the enclosure requesting information comprising device identifications (IDs) of all devices within the enclosure; and
      concatenating a portion of an address of the enclosure with each device ID to form the addresses of all devices within the enclosure.

2. The method as recited in claim 1, wherein the network comprises at least one Fibre Channel Arbitrated Loop (FC-AL), and wherein the addresses of enclosures and devices coupled to the at least one FC-AL are fabric addresses.

3. The method as recited in claim 1, wherein each enclosure comprises a small computer system interface (SCSI) enclosure services (SES) unit, and wherein the issuing comprises:
   issuing a command to the SES unit of an enclosure requesting a page of information including device identifications (IDs) of all devices within the enclosure.

4. The method as recited in claim 3, wherein the page is an SES-defined element descriptor page.

5. The method as recited in claim 4, wherein the element descriptor page includes an element descriptor for each device within the enclosure, and wherein each element descriptor comprises a device ID of a corresponding device within the enclosure.

6. The method as recited in claim 4, further comprising:
   extracting the device IDs of all devices in the enclosure from the information.

7. The method as recited in claim 3, wherein the address of the enclosure is the address of the SES unit of the enclosure.

8. The method as recited in claim 3, wherein the concatenating comprises:
   concatenating a loop address of the SES unit of the enclosure with the device ID of each device within the enclosure to form the addresses of all devices within the enclosure.

9. The method as recited in claim 7, wherein the loop address of the SES unit of the enclosure comprises the two most significant bytes of an address of the SES unit.

10. The method as recited in claim 8, wherein the concatenating is accomplished such that the loop address of the SES unit of the enclosure forms a higher order portion of the address of a given device, and the device ID of the device forms a lower ordered portion of the address of the given device.

11. The method as recited in claim 1, further comprising:
   storing the addresses of all devices within the enclosure.

12. The method as recited in claim 11, wherein the storing comprises:
   repeating the following steps for each device within the enclosure:
      allocating an entry in a table;
      generating a device number;
      storing the device number in a device number column of the entry; and
      storing the address of the device in an address column of the entry.

13. The method as recited in claim 12, wherein a different device number is generated for each device within the enclosure.

14. The method as recited in claim 12, further comprising storing an enclosure number assigned to the enclosure in an enclosure number column of the entry of the table.

15. A method for handling a fault condition within a device of a network, wherein the network comprises a plurality of enclosures, and wherein each enclosure houses at least one device, the method comprising:
   building a database including addresses of all enclosures and devices of the network;
   receiving a device identification (ID) of a device with a fault condition;
   concatenating a portion of an address of an enclosure housing the device with the device ID to form the address of the device with the fault condition; and
   accessing the database using the address of the device to obtain information regarding the physical location of the enclosure housing the device with the fault condition.

16. The method as recited in claim 15, wherein the network comprises at least one Fibre Channel Arbitrated Loop (FC-AL), and wherein the addresses of enclosures and devices coupled to the at least one FC-AL are fabric addresses.

17. The method as recited in claim 15, wherein each enclosure comprises a small computer system interface (SCSI) enclosure services (SES) unit, and wherein the address of the enclosure is the address of the SES unit of the enclosure, and wherein the concatenating comprises:
   concatenating a loop address of the SES unit of the enclosure with the device ID of the device with the failure to form the address of the device with the fault condition.

18. The method as recited in claim 17, wherein the loop address of the SES unit of the enclosure comprises the two most significant bytes of an address of the SES unit.

19. The method as recited in claim 17, wherein the concatenating is accomplished such that the loop address of the SES unit of the enclosure forms a higher order portion of the address of the device with the fault condition, and the device ID of the device with the fault condition forms a lower ordered portion of the address of the device with the fault condition.

20. The method as recited in claim 15, further comprising:
   using the address of the device to issue a command to the device with the fault condition.

21. The method as recited in claim 20, wherein the command is a shutdown command.

22. The method as recited in claim 20, wherein the command causes the device with the fault condition to flash a light on a display panel of the enclosure.

23. The method as recited in claim 15, wherein the database comprises an enclosure table and a device table.

24. The method as recited in claim 23, wherein the enclosure table includes information regarding the physical location of all enclosures of the network.

25. The method as recited in claim 24, wherein the accessing comprises:
   searching the enclosure table using the address of the enclosure housing the device with the fault condition; and
   obtaining the information regarding the physical location of the enclosure housing the device with the fault condition from an entry of the enclosure table including the address of the enclosure housing the device with the fault condition.

26. The method as recited in claim 15, further comprising:
   presenting the information regarding the physical location of the enclosure housing the device with the fault condition to a user.

27. The method as recited in claim 15, wherein a friendly name of the enclosure housing the device with the fault condition is also obtained from the database during the accessing.

28. The method as recited in claim 27, further comprising:
   presenting the information regarding the physical location and the friendly name of the enclosure housing the device with the fault condition to a user.

29. A network, comprising:
   a plurality of enclosures, wherein each enclosure houses at least one device; and
   a host coupled to each of the enclosures and configured to:
   (i) issue a command to a given one of the enclosures requesting information comprising device identifications (IDs) of all devices within the given enclosure, and (ii) concatenate a portion of an address of the given enclosure with the device IDs of all of the devices within the given enclosure to form addresses of all of the devices within the given enclosure.

30. A carrier medium comprising program instructions for deriving the addresses of all devices of a network, wherein the network comprises a plurality of enclosures, and wherein each enclosure houses at least one device, and wherein the program instructions are operable to implement:
   repeating the following steps for each enclosure of the network:
      issuing a command to the enclosure requesting information comprising device identifications (IDs) of all devices within the enclosure; and
      concatenating a portion of an address of the enclosure with each device ID to form the addresses of all devices within the enclosure.

31. The carrier medium of claim 30, wherein the carrier medium is a computer-readable storage medium.

32. The carrier medium of claim 31, wherein the computer-readable storage medium is a floppy disk or a compact disk read only memory (CD-ROM) disk.

* * * * *